United States Patent

Wellnitz

[15] 3,640,286
[45] Feb. 8, 1972

[54] ASHTRAY WITH USE INDICATOR

[72] Inventor: Gregory L. Wellnitz, Waterbury, Conn.

[73] Assignee: Universal Oil Products Company, Des Plaines, Ill.

[22] Filed: July 15, 1970

[21] Appl. No.: 55,027

[52] U.S. Cl. .......................... 131/235, 131/238, 131/242, 116/114
[51] Int. Cl. ..................................................... A24f 15/08
[58] Field of Search ............... 131/231, 235, 238, 241, 242; 116/114, 135

[56] References Cited

UNITED STATES PATENTS

| | | | |
|---|---|---|---|
| 1,519,372 | 12/1924 | Geyer | 116/114 |
| 2,270,781 | 1/1942 | Friedman | 131/235 R |
| 2,494,979 | 1/1950 | Worthing | 131/242 X |
| 2,555,716 | 6/1951 | Todhunter | 131/235 R X |
| 2,588,537 | 3/1952 | Kelly | 131/242 X |
| 2,673,544 | 3/1954 | Erickson | 116/114 |
| 3,095,108 | 6/1963 | McKenzie | 131/242 X |
| 3,137,304 | 6/1964 | McDonald | 131/235 R |
| 3,472,239 | 10/1969 | Gielow et al. | 131/235 R |

*Primary Examiner*—Joseph S. Reich
*Attorney*—James R. Hoatson, Jr. and Philip T. Liggett

[57] ABSTRACT

An ashtray with interconnected indicator means for showing use thereof. The indicator means is particularly useful for ashtrays that are mounted in aircraft seat armrests or in other public conveyances such that only those showing usage need be cleaned by maintenance personnel. The indicator means is tripped by the opening of the ashtray lid, or by a movable snuffer section, so as to show usage, while a "reset" to show a clean ashtray is only accomplished by a "reset key" or by a special operation to be effected by the cleaning personnel.

9 Claims, 9 Drawing Figures

PATENTED FEB 8 1972
3,640,286
Figure 1
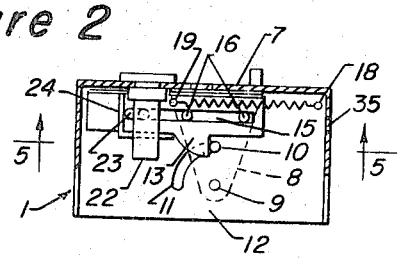
Figure 2
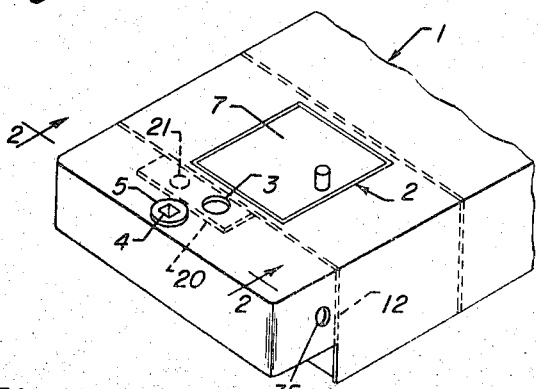
Figure 4
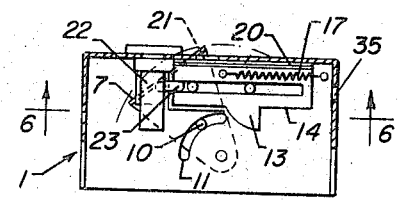
Figure 3
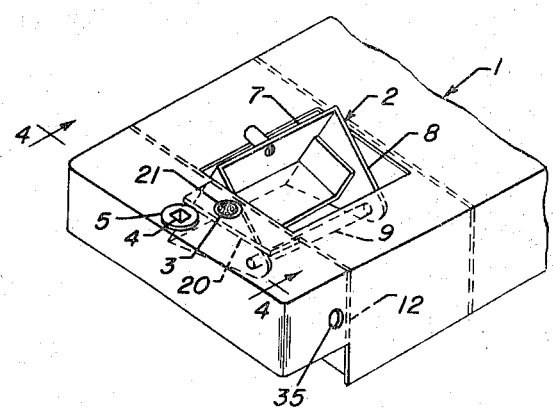
Figure 5
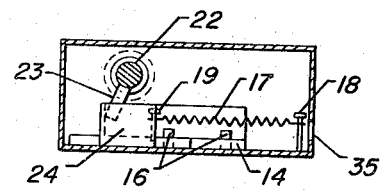
Figure 7
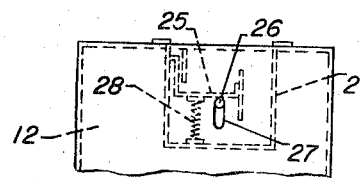
Figure 6
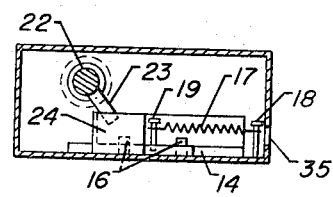
Figure 8
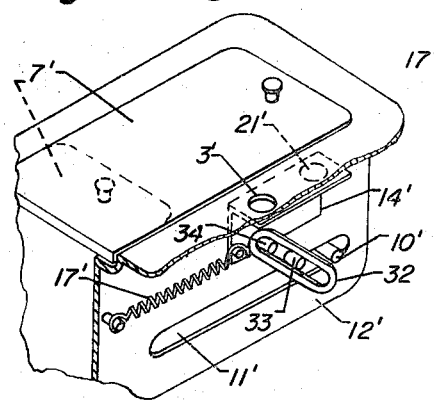
Figure 9
INVENTOR:
Gregory Lloyd Wellnitz
BY: James P. Hoatson, Jr.
Philip T. Liggett
ATTORNEYS

ASHTRAY WITH USE INDICATOR

This invention relates to a novel type of ashtray that has indicator means combined therewith to show whether there has been usage of the ashtray.

More particularly, the present invention is directed toward a "use" indicator means that is interconnected with a lid, snuffer, or other movable portion of the ashtray, such that a visible indicator means will be triggered to show that there has been usage of the ashtray.

In connection with large "jumbo" aircraft, trains, public rooms, and the like, where the time taken to clean all ashtrays is significant, there can be a valuable reduction in cleaning time and costs where there is a system to require a cleaning of only such ashtrays as have been used. For example, in each of the new large jet aircraft there will be from 350 to 500 passenger seats, such that if the present practice of cleaning all ashtrays at the end of each flight is followed there will be a major expense involved in just effecting the cleaning of ashtrays. On the other hand, if only one-third or one-fourth of the ashtrays are used and these can be readily spotted by the cleaning personnel, then there can be a significant savings in time and expense for the maintenance divisions.

It is thus a principal object of the present invention to provide a use indicator in combination with a movable portion of an ashtray such that a cleaning operation can be eliminated in the event the indicator shows no usage of the ashtray.

It is a further object of the present invention to have a reset means for the indicator which will embody the use of reset key or tool, or entail a special operation which, in general, is only known by the cleaning personnel, so as to preclude users from toying with the indicator means.

In a broad aspect, the present invention embodies an ashtray unit with an indicator of use means that is adapted for mounting in a seat armrest or other support means, which comprises in combination, an ash receptacle section adapted for mounting within the support means, a movable actuating member connective with said ashtray and normally movable upon the use of the latter, a spring-biased slide member movably mounted below the surface of said support means, engagement means extending between said actuating member and said slide member whereby there is movement of the latter from a first position to a second position upon an initial movement of said actuating member, visible indicator means connective with said slide member for showing movement of said actuating member, spring biasing means for aiding the retention of said side member in its second position and a reset access means extending through said support means whereby said slide member can be moved and returned to its first position.

Typically, the movement of the lid of the ashtray may be utilized to in turn move an actuating member that will be linked to the indicator means to show usage of the ashtray. On the other hand, a movable snuffer member within the ash receptacle might well be used to effect the triggering of the indicator means for such ashtrays that may not have a lid or cover. It is also to be realized that various types of rotating or slidable type lids may be combined with an ashtray or receptacle and that it is not intended to limit the invention to any one form of movable lid, or other movable member, in combination with the ashtray to show that it has been used.

A usage indicator can be directly engaged or linked to the opening and closing of an ashtray lid; however, in order to preclude a person from toying with a lid or other movable member in the ashtray, which in turn is moving the indicator means, it is desired in a preferred embodiment to have the indicator be moved upon an initial movement of the lid or other actuating member and to stay in the tripped position until such time as the ashtray has been cleaned and the indicator means reset to show a "clean" or unused ashtray. Thus, a preferred embodiment will make use of a special resetting operation which will be known only to the cleaning personnel or, alternatively, will embody the use of a special key or tool that can assist in the reset of the usage indicator means upon the completion of the cleaning operation.

Various types of indicator means as well as mechanisms to move the indicator can be linked to a movable actuating member; however, in one embodiment, as provided herein, there may be the sliding of a visible mark into or by an opening or "window" section in the armrest or other ashtray support means. Thus, during routine cleaning operations, the cleaning personnel would clean only those ashtrays which would have the visible indicator means showing a colored mark, or the like, in turn providing the signal of a used ashtray.

Where the actuating member for the indicator means works in cooperation with an internal cigarette snuffer, rather than from a movable lid, then the reset of the use indicator may be accomplished from a pushbutton, movable pin, or the like, operated from a hidden portion of the ash receptacle below the lid, or alternatively, from a normally hidden portion of the ashtray support means. However, where the movable lid serves as the actuating member for the indicator means, then the reset may well be from a simple reset key, or tool, which is inserted into a portion of the ashtray support means so as to permit the retention of the indicator means to a "clean" position upon the completion of the ashtray cleaning operation and the closing of the movable lid. The reset key will, for example, turn a linkage member to hold the indicator in a restrained position, or it may be effecting the mechanical and manual movement of the indicator mark or flag through the use of a gear and a toothed rack means.

Reference to the accompanying drawing and the following description thereof will serve to illustrate one embodiment of the present improved ashtray unit with its usage indicator means, as well as illustrate alternatives in reset means and in variations in construction and design with respect to the triggering of the usage indicator means.

FIG. 1 of the drawing is an external isometric-type view indicating an ashtray with a movable lid in a closed position, an indicator window, and readily available socket means to accommodate a reset tool for a movable indicator means.

FIG. 2 of the drawing indicates, in a sectional elevation view along line 2—2 in FIG. 1, a sliding member which is releasable for movement upon the opening of the ashtray lid.

FIG. 3, similar to FIG. 1, indicates an isometric view of the ashtray unit with the lid opened and a colored mark showing through the indicator window.

FIG. 4 is a sectional elevation view, as indicated by lines 4—4 in FIG. 3, showing the indicator slide mechanism having been moved as a result of movement from the ashtray lid.

FIGS. 5 and 6 are sectional views of the indicator portion of the ashtray, indicated by lines 5—5 and 6—6 respectively in the FIGS. 2 and 4, which show the linkage between the slide means and a reset arm.

FIG. 7 indicates diagrammatically the use of a movable pin member connective with a movable cigarette snuffer in the ash receptacle in lieu of a movable pin connective with the ashtray lid.

FIGS. 8 and 9 are a partial isometric-type and a partial sectional view respectively, indicating diagrammatically the use of a slidable ashtray lid to trip or release a spring-biased sliding usage indicator means.

Referring now particularly to FIGS. 1, 2, 3 and 4 of the drawing, there is indicated a portion of a seat armrest or other ashtray support means 1 adapted to hold a recessed ashtray unit 2 as well as accommodate movable indicator means and reset means in a manner that will have them primarily hidden below the upper surface of the support means. There is, however, indicated a windowlike opening 3 in the upper surface of the support means so as to see a "use" indicator and a recessed socket 4 in a turnable mounting 5 in order that there may be accommodation of a reset tool, such as an "Allen" wrench or the like. In FIG. 1, a rotatable and movable lid 7 is shown closed and a blank or "clean" signal indicated in the window 3, while with respect to FIG. 3, the lid 7 is shown open and a colored indicator mark is visibly showing "usage" through the window 3.

In FIGS. 2 and 3, there are indicated end sections 8, rotatable about a shaft means 9, and connective with the lid means 7 such that the latter rotates approximately 90° to provide access to the ash receptacle or interior portion of the ashtray unit 2. As best shown by FIG. 2, one end member 8 for rotating lid 7 is provided with a pin or other projection 10 that can rotate in a curved slot 11 within partition plate 12. It will also be noted that the pin 10 is adapted to engage a side portion of a shoulder or camlike projection 13 on slide member 14. The latter has a slotted interior portion 15 engaging guide pins 16 such that it may move laterally to provide an indication through the window 3 that the lid member 7 has been opened. There is also indicated a tension spring 17 connecting between a fixed pin 18 on plate 12 and a pin 19 on slide member 14, whereby the latter is biased to the right (as shown in FIG. 2) after the lid 7 has been opened and moved downwardly such that pin 10 has also moved in the arcuate slot 11 out of the way with respect to holding the slide member 14 in its lefthand position. Thus, with an upper portion 20 of the slide member 14 provided with a colored mark 21, as best shown in FIG. 1, and available to move in alignment with the observation window 3 upon the movement of the lid 7 and of the slide member 14, there is the desired indication of ashtray usage.

Upon reference to FIGS. 3 and 4, it will be noted that mark 21 on upper portion 20 of the slide member is shown under window 3 to accompanying the fact that lid 7 has been opened and the ashtray ready for use. Also, as best noted in FIG. 4, there is shown that there has been movement of pin 10 in slot 11 responsive to the opening of the lid 7 and an accompanying resulting movement of the slide member 14, due to the spring 17 biasing, whereby the mark 21 on upper portion 20 can come into alignment with the window opening 3. It will also be observed that since cam or shoulder section 13 moves to the right, and beyond the initial position for pin 10 when the lid 7 is closed, that the slide member 14 will be retained in the "used" position, even though the ashtray lid 7 is opened and shut numerous times after its initial usage. In other words, the present embodiment provides that the slide member 14 and the accompanying indicator mark 21, visible through window 3, will show usage until such time as slide member 14 has been pulled back or "reset" into the initial position of FIG. 2 and the lid 7 closed such that pin 10 will retain the shoulder means 13 and the entire slide member 14 in the "clean" position. In this reset position, the "use" mark 21 is out of alignment with window 3.

As one means of effecting the reset of the slide member 14 and also of the indicator means to the "clean" position, there is shown the use of the pivotable member 5, having recessed section 4, and an internally projecting shaft section 22 in turn having a radial arm member 23 which is adapted to engage a projecting portion 24 in the slide member 14. As best shown by the underneath views, comprising FIGS. 5 and 6, the reset shaft 22 with arm 23 engages an end projection member 24 on slide member 14 so as to be able to push the latter to the left against the biasing force from spring member 17 so as to provide the initial "clean" indicator position. In FIG. 6 there is shown the movement of slide member 14 to the right, or into a "used" position, from the result of opening the lid 7. In this case, the rotating shaft 22, with arm 23 has moved approximately 90° by virtue of the engagement of such arm with the end member 24.

In order to accomplish the actual reset of the member 14 and its indicator means 21 after a cleaning of the ashtray receptacle, there is provided a closing of the lid member 7, a turning of the reset shaft 22, through key or tool means such as 6 in recess 4 of the external portion of the reset means 5, whereby arm 23 will bear against the end portion 24 on slide 14 and move the latter from the position of FIG. 6 into the position of FIG. 5 and FIG. 2. The latter position will then be retained by virtue of pin 10 bearing against shoulder means 13, as shown in FIG. 2, until such time as the ashtray lid 7 is again opened. At the same time, it is to be realized that the "usage" indicator mark 21, on upper portion 20 of slide 14, will be moved from the window section 3 to a hidden position under the arm support surface. The "use" mark is thus out of sight until such time as the slide member 14 is released and pulled to the right by spring biasing means 17 upon lid 7 operation, whereupon indicator mark 21 will then become in alignment with window 3. In lieu of reset shaft 22 and arm 23 there may be an opening 35 in support means or side of arm, opposite end portion 24, such that a rod or other tool can push on such end portion 24 and effect a reset to the "clean" position.

It is to be noted that the present invention shall not be limited to any one kind of usage indicator mark or to any one type of window means, inasmuch as various types of marks or signals may well be mechanically linked to the movement of an ashtray lid or other actuating member showing that the ashtray has been used. Thus, the slide member 14 and the colored indicator mark 21 comprise merely one embodiment of indicator or signal means.

With reference to FIG. 7 of the drawing, there is indicated diagrammatically the utilization of a movable cigarette snuffer member 25, within the receptacle section of the ashtray unit 2, and a pin member 26 connecting to an end portion of such snuffer so as to be able to move therewith, as well as within slot means 27 provided in the partitioning plate 12. There is also indicated the use of a compression spring 28 below snuffer member 25 so that the latter is biased to be in a raised position against the normal downward pushing movement of a person snuffing out a cigarette against the upper surface of snuffer member 25. The rest of the combined unit, i.e., a slide member with a usage indicator means may be in accordance with that shown in the embodiment of FIGS. 2, 3 and 4, with the exception that the pin means 26 replaces the pin means 10 and the vertical slot 27 replaces the arcuate slot 11 in plate 12. In the operation of this modified embodiment, upon a first usage of the snuffing of a cigarette against member 25 and a resulting downward movement thereof with pin 26 as the holding pin 26 moves away from the cam or shoulder member 13 on slide member 14, there will be the movement of the slide to the right whereby mark 21 can come into alignment with the window section 3 and show a usage of the ashtray unit. The reset operation to be effected by the cleaning personnel, following the cleaning of the ashtray unit, will be in accordance with the heretofore-described operation where a reset tool or key can turn shaft 22 and arm 23 to pull the slide member 14 to a left-hand position and let pin member 26 (in lieu of the pin member 10) come into position against the shoulder portion 13 of the slide member 14 so as to hold the slide member in a "triggered" position for a next usage of the ashtray unit.

FIGS. 8 and 9 of the drawing indicate another variation of the present invention to the extent that an ashtray lid 7' is arranged to slide back and forth rather than rotate. Connecting to the lid 7' there is provided a depending member 8' with a pin member 10' and the latter, in turn, is adapted to move within a horizontal slot portion 11' provided in partition 12'. In addition, there is a spring-biased slide member 14' mounted to slide on spaced pins 30 and 31 fixed to and extending from partition 12'. A link member 32 is mounted on fixed pin 33 and on a pin 34 projecting from the slide 14' as shown in FIG. 9. When the lid 7' is closed and the slide member 14' is placed in the position shown in dotted lines in FIG. 9, the lower portion of the link 32 is biased against the projecting pin member 10' by the spring 17'. Upon opening the lid 7', the pin member 10' biases the slide 14' initially toward the right as shown in FIG. 9 until the pin member 10' passes below the lower end of the link 32, whereupon the pin member is caused to assume the position 10'' and the slide the position 14'', where it is retained by the biasing action of a tension spring 17'. Subsequent back and forth movements of lid member 7' will not effect the movement of slide member 14' nor affect the movement of an upper section 20' which can have a "use" indicator mark 21' to align with a window 3' or other signal means by reason of the lower end of link member 32 being held above slot 11' and moving pin 10'.

After the ashtray unit has been cleaned and it is desired to reset the indicator means to show the "clean" position, there will be a closing of lid 7' followed by a reset of slide member 14' (to the right hand direction as shown in the drawing) through the use of an access opening (not shown) and a reset "tool" that can be inserted in such opening in the ashtray support to work against the biasing of spring member 17. The tool can be a special rod or perhaps a conventional screwdriver capable of pushing member 14' to the original "clean" position where the "use" signal will not show. However, upon a subsequent opening of lid 7' the slide member 14' will again show the accompanying movement of the signal or "use" indicator means and the fact that there has been an opening and usage of the ashtray unit.

It is to be understood that the designs and shapes of the slide members, ashtray lids, snuffer means, reset member, reset tool, spring means, and the like are merely diagrammatic and not limiting to the present invention, inasmuch as other shapes and configurations, as well as equivalent linkage means, may well be used within the scope of the present invention. Also, the present invention should not be limited to usage of an ashtray unit within a vehicle armrest inasmuch as a similar type of indicator system may be used in combination with an ashtray that is in a stand or within other support means.

I claim as my invention:

1. An ashtray unit with an indicator of use means that is adapted for mounting in a seat armrest or other support means, which comprises in combination, an ash receptacle section adapted for mounting within the support means, an indicator movement actuating member connective with said ashtray and normally movable upon the use of the latter, a slide member movably mounted under the surface of the support means, engagement means extending between said actuating member and said slide member whereby there is movement of the latter from a first position to a second position upon an initial movement of said actuating member, visible indicator means connective with said slide member for showing movement of said actuating member, spring biasing means for aiding the retention of said slide member in its second position and a reset access means extending through said support means, whereby said slide member can be moved and returned to its first position.

2. The ashtray unit of claim 1 further characterized in that said movable actuating member comprises a movable lid for the ashtray unit.

3. The ashtray unit of claim 2 still further characterized in that said movable lid is rotatably movable.

4. The ashtray unit of claim 2 still further characterized in that said movable lid is slidably movable.

5. The ashtray unit of claim 1 further characterized in that said movable actuating member comprises a movable cigarette snuffer member.

6. The ashtray unit of claim 1 still further characterized in that said slide member has a member projecting therefrom and said engagement means extending between said actuating member and said slide member comprises a projecting portion from the actuating means and is movable therewith, said portion being arranged to engage said projecting member on said slide member as said actuating member is in said first position, whereby the slide member is held to an initial position until such time as the actuating member has an initial movement.

7. The ashtray unit of claim 1 further characterized in that said support means includes a window section and a visible mark is provided on said slide member in a manner to be in alignment with said window section on said support means when said slide member is in its second position, whereby said mark shows usage after the actuating means has been moved.

8. The ashtray unit of claim 1 further characterized in that said slide member has a member projecting therefrom and said reset access means incorporates a shaft section inserted into the support means and having a radially extended arm member sized to engage said projecting member on said movable slide member, said projecting member and the shaft and arm member being mutually movable such that the latter can move the entire slide member and the indicator mark thereon to said first position, whereby the usage indicator mark is nonvisible until said actuating member permits movement of said slide member from a first position to a second position.

9. The ashtray unit of claim 1 further characterized in that said reset access means comprises means providing an opening in the support means for the insertion of a tool to in turn effect a pushing of the projecting member on said slide member to its first position.

* * * * *